United States Patent [19]

Keleher

[11] Patent Number: 5,049,051

[45] Date of Patent: Sep. 17, 1991

[54] MULTI-PIECE TILTED APEX SEAL ASSEMBLY

[75] Inventor: Daniel B. Keleher, Bettendorf, Iowa

[73] Assignee: Deere & Company, Moline, Ill.

[21] Appl. No.: 549,844

[22] Filed: Jul. 9, 1990

[51] Int. Cl.⁵ .............................................. F01C 19/04
[52] U.S. Cl. .................................... 418/113; 418/121
[58] Field of Search ............... 418/61.2, 113, 121–124, 418/142, 143

[56] References Cited

U.S. PATENT DOCUMENTS

| | | |
|---|---|---|
| 3,142,439 | 7/1964 | Froede . |
| 3,193,189 | 7/1965 | Rastogi . |
| 3,204,615 | 9/1965 | Starmuehler . |
| 3,269,369 | 8/1966 | Ehrhart .............................. 418/121 |
| 3,685,922 | 8/1972 | Lamm ................................. 418/113 |
| 3,830,600 | 8/1974 | Shimoji et al. ..................... 418/113 |
| 3,853,438 | 12/1974 | Sato ..................................... 418/113 |
| 3,873,250 | 3/1975 | Batten ................................. 418/123 |
| 3,947,162 | 3/1976 | Lamm ................................. 418/121 |
| 4,056,338 | 11/1977 | Eiermann ........................ 418/121 X |
| 4,222,720 | 9/1980 | Shimizu et al. .................... 418/121 |
| 4,317,648 | 3/1982 | Shimizu et al. .................... 418/120 |
| 4,358,259 | 11/1982 | Morita ................................. 418/122 |
| 4,403,930 | 9/1983 | Kodama .............................. 418/121 |

FOREIGN PATENT DOCUMENTS 1170207  5/1964 Fed. Rep. of Germany ...... 418/122
1242938  6/1967 Fed. Rep. of Germany .

OTHER PUBLICATIONS

Fujimoto et al., "Present and Prospective Technologies of Rotary Engines", SAE Tech Paper No. 870446, Feb. 1987.

Primary Examiner—Richard A. Bertsch
Assistant Examiner—David L. Cavanaugh

[57] ABSTRACT

Apex seals are installed in slots in the apexes of a rotor in a rotary engine. Each apex seal assembly includes an outer sealing member, an inner support member, a pair of side or end members, a pair of hollow cylindrical slotted corner seal members mounted in the corner recesses, a pair of solid cylindrical resilient inserts mounted in the corner seal members and a pair of underseal springs to urge the seal members outwardly towards the running surface. The apex seal and its slot are tilted with respect to the rotor lobe centerline. The sealing and support members have mating inclined surfaces which form an inclined interface which is spaced entirely outside of the outer cylindrical surface of the corner seal member.

5 Claims, 2 Drawing Sheets

MULTI-PIECE TILTED APEX SEAL ASSEMBLY

BACKGROUND OF THE INVENTION

This invention relates to rotary internal combustion engines, and more particularly, to improved multi-piece apex seal assemblies therefore.

Rotary engine apex seals have historically worn too fast, thus limiting the life of the engine. Various attempts have been made to reduce apex seal wear by using lower friction and/or more wear resistant materials and by reducing the factors and forces which contribute to wear. For example, tilted apex seals are shown in U.S. Pat. No. 3,124,439, issued July 28, 1964 to Froede, in U.S. Pat. No. 3,269,369, issued August 30, 1966 to Ehrhardt, in U.S. Pat. No. 3,853,438, issued December 10, 1974 to Sato, and in U.S. Pat. No. 4,056,338, issued November 1, 1977 to Eiermann. Multi-piece apex seals have also been proposed. For example, see U.S. Pat. No. 4,317,648, issued March 2, 1982 to Shimizu et al. and U.S. Pat. No. 4,358,259, issued November 9, 1982 to Morita. However, it would be desirable to provide an apex seal assembly with improved wear capabilities for use in the high speed and high temperature environment of a stratified charge rotary internal combustion engine.

SUMMARY OF THE INVENTION

An object of the present invention is to provide a rotary engine with an apex seal arrangement which has improved wear capabilities.

Another object of the present invention is to provide a rotary engine with an apex seal arrangement wherein engagement between the seal and the running surface is consistently maintained.

These and other objects are achieved by the present invention wherein multi-piece apex seal assemblies are mounted in slots in the apex portion of each rotor lobe between a pair of corner recesses. Each apex seal assembly includes an outer sealing member, an inner support member, a pair of side or end members, a pair of hollow cylindrical slotted corner seal members mounted in the corner recesses, a pair of solid cylindrical resilient inserts mounted in the corner seal members and a pair of underseal springs to urge the seal members outwardly towards the running surface. The apex seal and its slot are tilted with respect to the rotor lobe center line to more closely align the apex seal and slot with the trochoid reaction force. This improves the compliance or the ability of the apex seal to maintain engagement with the running surface. Tilting the seal also more closely aligns the seal and slot with the direction of the seal-housing interaction forces when the seal is subjected to the highest loads. This reduces the forces which interfere with the ability of the apex seal to maintain engagement with the running surface. The seal is tilted and positioned and its outer curvature is such that, as the rotor moves within the housing, the point of contact between the outer seal surface and the running surface will move about on the outer seal surface within a range which is substantially symmetrical with respect to the center line of the rotor lobe. The sealing and support members have mating inclined surfaces which form an interface which is inclined radially inwardly in a direction opposite to the direction of rotor rotation. This interface is spaced entirely outside of the outer cylindrical surface of the corner seal member to prevent the edges of the inclined surfaces from catching on the corner seal member or on the rotor. Since the top piece is shorter, its beam stiffness is reduced to allow the seal to better conform to the housing, and the temperature difference between the top and bottom is less, thus reducing the potential for thermal deformation. The lighter mass of this apex seal assembly (because of reduced seal thickness, reduced seal height, and smaller springs) nearly doubles the natural frequency of the spring-mass system as compared to conventional designs, even though the underseal springs are smaller and apply less preload to the seal. The center line of the rotor lobe and the center line of the seal members intersect at a point P and the outer seal member has an outer seal surface which has a center of curvature which lies on the lobe center line. This intersection point is located on or near the outer surface of the seal member and nearer to the outer surface than to the center of curvature.

DETAILED DESCRIPTION

Figure 1:
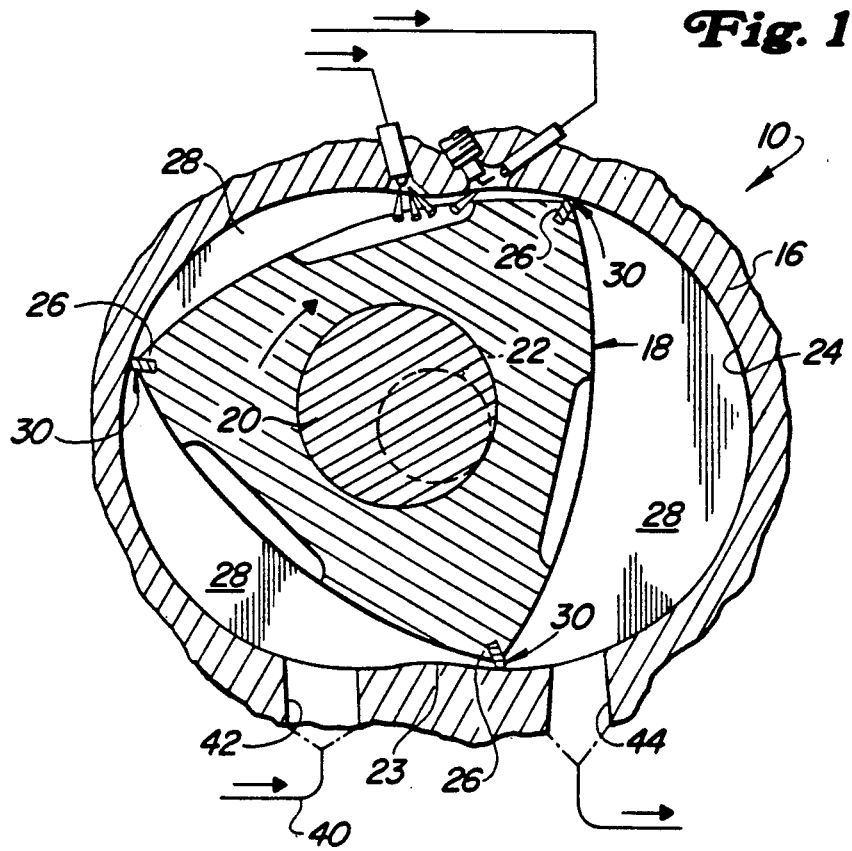
FIG. 1 is a simplified diagrammatic section of a rotary piston internal combustion engine illustrating the environment of the present invention.

A rotary combustion engine is schematically indicated at 10. The engine 10 comprises an outer body or housing consisting of two axially spaced end housings (not shown) and an intermediate or rotor housing 16, the housings being secured together to form the engine cavity therebetween. An inner body or rotor 18 is journaled for rotation within said housing cavity on an eccentric portion 20 of a shaft 22 which extends coaxially through and is supported by bearings (not shown) in the end housings (not shown). The axis of the shaft 22 is perpendicular to the inner walls of the end housings (not shown).

The peripheral inner or running surface 24 of the rotor housing 16 is illustrated as having a two-lobe profile which preferably is basically an epitrochoid. The rotor 18 has a generally triangular profile with apex portions 26 having sealing cooperation with the trochoidal surface 24 to form three engine working chambers 28 between the rotor 18, the end housings and the rotor housing 16. Each of the rotor apex portions is provided with an apex seal assembly 30 which extends across the rotor between the inner walls of the end housings (not shown) and the rotor 18 also has suitable oil seals (not shown) on its end faces for sealing contact with the inner walls of the end housings.

The engine 10 also includes conventional gearing (not shown) between the rotor 18 and the engine housing to control the relative rotation of the rotor 18. The engine 10 also includes an air intake passage 40 which supplies air to an air intake port 42 and an exhaust port 44.

Figure 2:
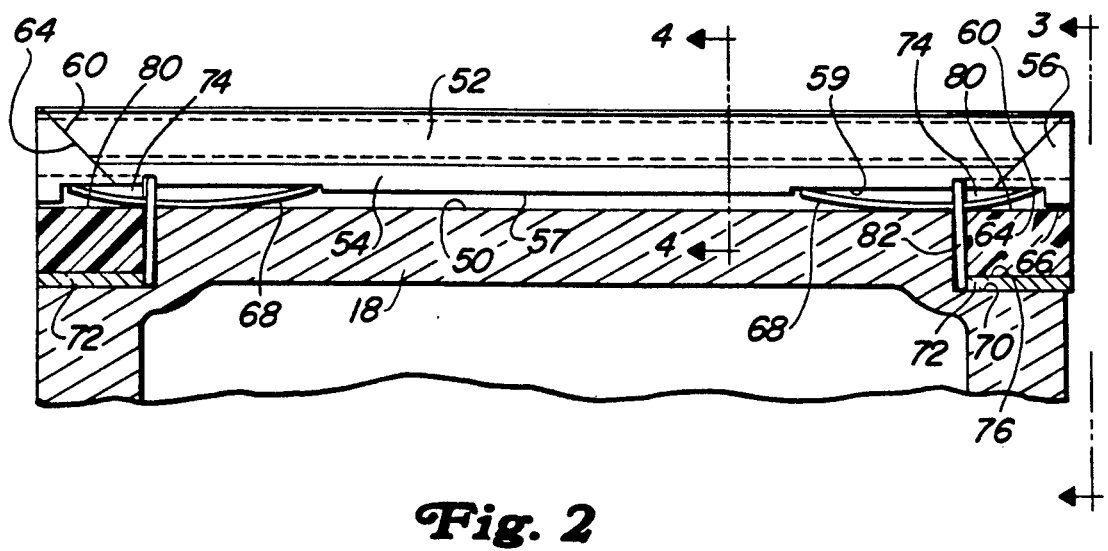
FIG. 2 is a partial sectional view of the seal assembly of the present invention viewed in the direction of rotation of the rotor.
Figure 3:
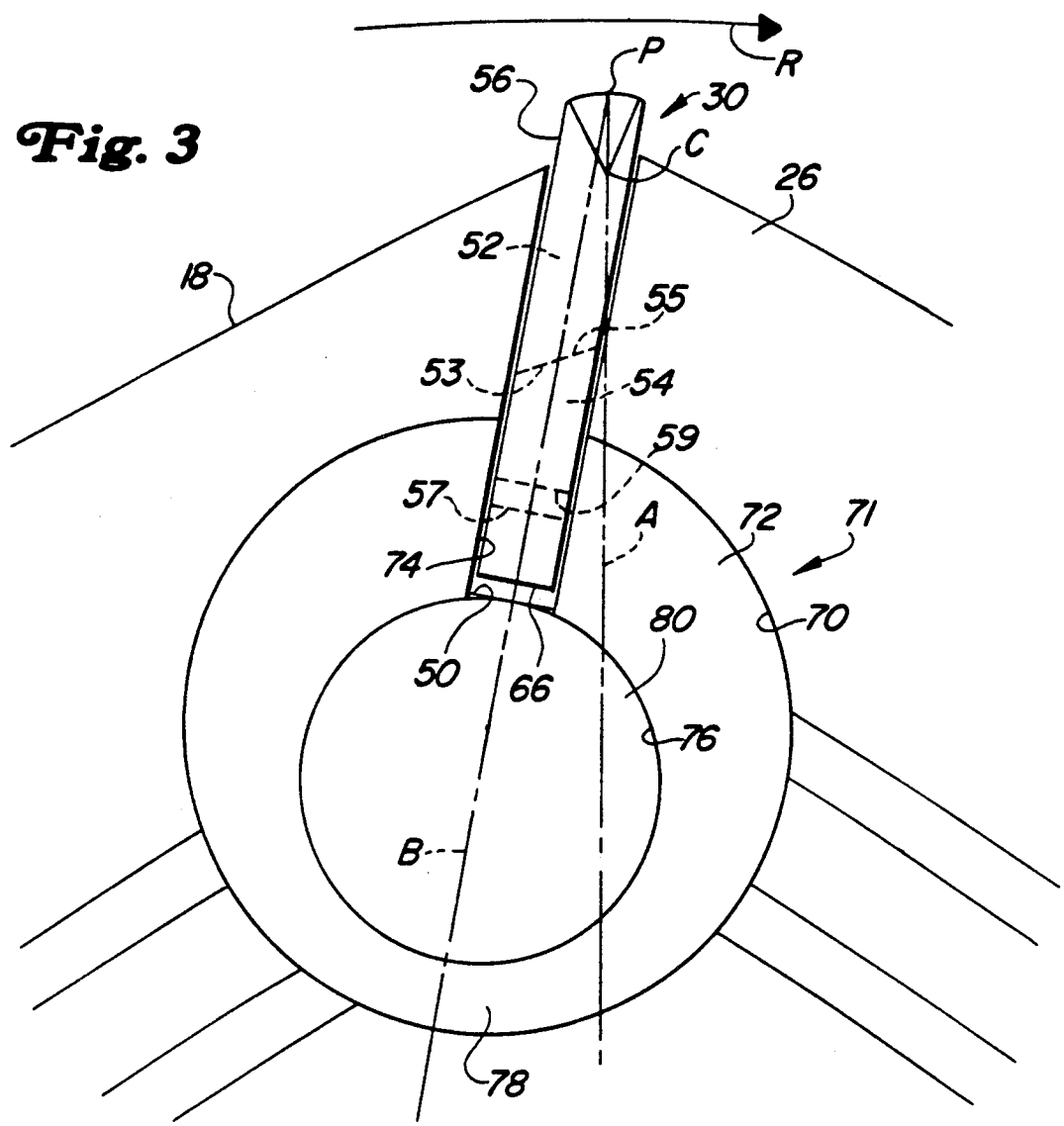
FIG. 3 is an end view along lines 3-3 of FIG. 2.
Figure 4:
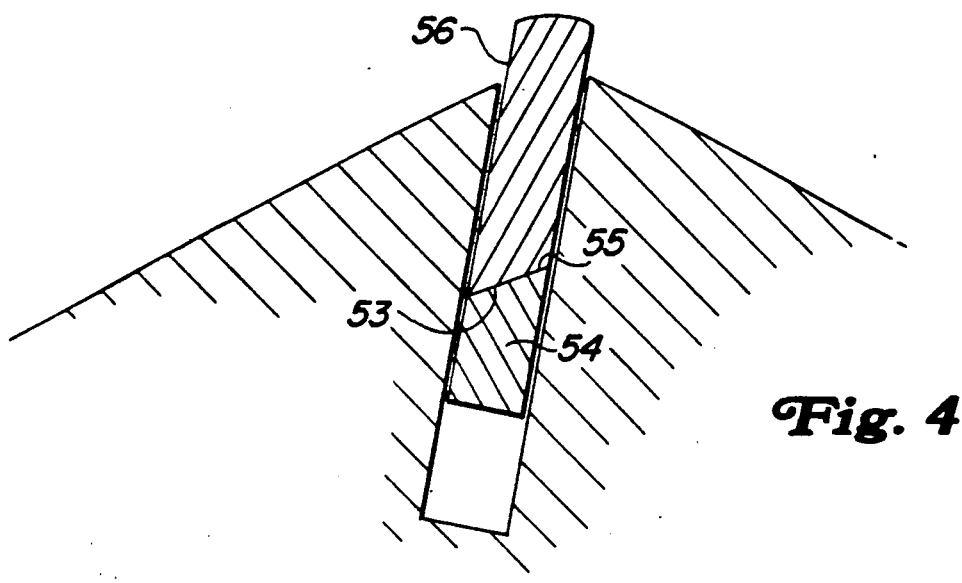
FIG. 4 is a sectional view along lines 4—4 of FIG. 2.

Referring now to FIGS. 2 and 3, each rotor apex portion includes an axially extending sealing groove 50 for receiving the apex seal assembly 30 therein. The apex seal assembly 30 comprises an elongated outer sealing member 52, an elongated inner support member 54 and a pair of side or end members 56. The sealing and support members 52 and 54 are mounted in the sealing groove 50 in an overlapping or superposed relationship.

Each side member 56 has an inclined end surface 60 which engages corresponding inclined surfaces on opposite ends of members 52 and 54. Each side member 56 also has a tab 66 which extends radially inwardly from an axial end thereof. A pair of leaf springs 68 are mounted in the groove 50, each spring having a first end engaging the underside of one of the side members 56 adjacent the tab 66, a second end engaging a shoulder formed between bottom surfaces 57 and 59 on the underside of the support member 54 and a center portion engaging the bottom of the groove 50. Thus, the members 52, 54 are resiliently forced toward the running surface 24 of the rotor housing 16. The seal parts are preferably coated with "Dicronite" to reduce friction during the critical break-in period.

The support member 52 restricts the high pressure in the combustion chamber from fully reaching under the apex seal. Because the seal members 52, 54 are thinner than in conventional designs, the pressure that does get under the seal members acts on a smaller area, thus resulting in reduced pressure loading. The seal member 52, being thinner than in the conventional design, has less area upon which the high pressure can act to lift the seal member 52 off of the running surface 24, thereby enhancing chamber sealing. Also, since the height of the seal member 52 is less than in the conventional design, the area upon which pressure can act to force the seal member 52 against the side of the slot 50 is reduced. This reduces the friction force which interferes with radial seal motion, thus improving seal/running surface engagement.

As best seen in FIG. 3, the center line A of the rotor lobe and the center line B of the seal members 52 and 54 intersect at a point P and seal member 52 has an outer seal surface which has a center of curvature C which lies on the lobe center line A. This intersection point P is located on or near the outer surface of the seal member 52 and therefore, nearer to the outer surface than to the center of curvature C. With this arrangement, as the rotor 18 moves within the housing 16, the point of contact between the outer seal surface and the running surface 24 will move about on the outer seal surface within a range which is substantially symmetrical with respect to the center line A of the rotor lobe.

Also, as best seen in FIG. 3, the sealing and support members 52 and 54 have inclined surfaces 53 and 55, respectively, which engage each other and which form an inclined interface. Arrow R indicates the direction of rotor rotation. Thus, it can be seen that the leading edge of the interface is spaced radially outwardly with respect to its trailing edge. Thus, the sealing and support members 52 and 54 are forced toward the running surface 24 of the rotor housing 16 under the action of the springs 68, and a sideward force is produced to urge the sealing member 52 towards one side of the groove 50 and the support member 54 towards the other side. The interface formed by surfaces 53 and 55 is spaced entirely outside of the outer cylindrical surface of the corner seal member 72. This prevents the edges of surfaces 53 and 55 from catching on the outer edges of the corner seal member 72 at the outer end of the slit 74 or on the rotor is at the intersection between groove 50 and the recess 70. This assures that the seal members 52 and 54 will be able to freely move radially in and out of the groove 50.

The rotor 18 has corner seal recesses 70 at opposite ends of the sealing groove 50 for receiving corner seals 71. Each corner seal 71 includes a cylindrical corner seal member 72 mounted in the recess 70. The member 72 has a longitudinally extending slit 74 and a circular opening 76 which is eccentric with respect to the cylindrical outer surface of the member 72 so as to provide a thin flexible portion 78 at a position diametrically opposite to the slit 74. Thus, the member 72 has a radial resiliency and is mounted in the recess 70 so that it has the ability to expand radially outwardly. This provides a close contact between the outer surface of the corner seal member 72 and the recess 70 to establish a reliable seal. The support member 54 and the side members 56 are received at each end by the slit 74 of the corner seal member 72. The sealing member 52 is not received by the slot 74 of the corner seal member 72, but only acts in the rotor slot 50, thereby eliminating the possibility of becoming clamped by misalignment between the rotor slot 50 and the slot 74. Also, the slot 74 is wider than the rotor slot 50 so as to reduce clamping on the support member 54 and the side member 56 as a result of any misalignment of the slots. A solid cylindrical insert 80, preferably formed of a resilient material, such as "Viton", is mounted in the opening 76 so as to be engagable with the bottom of the tab 66. The resilient insert 80 allows the corner seal member 72 to be more flexible and seal better in its recess. The insert 80 has no slot, and is therefore easier to manufacture than conventional slotted inserts. A corner seal spring 82 is mounted in each recess 70 so as to urge the corner seal members 72 away from each other and into engagement with the end housings (not shown). For ease of manufacture, the geometry of the seal parts requires only straight machining cuts. The rotor slot 50 is straight and much less deep than in conventional designs. Preferably, there are no chamfers on the slot opening to reduce the span between seal/slot contact points, but radii are used to prevent gouging.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An apex seal assembly for a lobed rotor of a rotary engine wherein the rotor has an apex seal slot in an apex portion thereof, a seal member mounted in the slot, the seal member and the slot being inclined with respect to a center line of the rotor lobe, and the seal member having an outer sealing surface having a center of curvature which lies on the center line of the rotor lobe, characterized by:

the center line of the rotor lobe and a center line of the slot intersect at a point, said point being located near the outer surface of the seal member and said point being closer to the outer surface of the seal member than to said center of curvature.

2. An apex seal assembly for a lobed rotor of a rotary engine, an apex portion of the rotor having a seal slot and a corner seal recess formed therein, the seal assembly having apex seal members received in the slot, a corner seal member received in the recess, the corner seal member having a central opening therein and a notch which receives a portion of at least one of the apex seal members and an insert received in the central opening of the corner seal member and engaging said portion of said one of the apex seal members, the apex seal members comprising an outer member having a seal surface for engaging a running surface of the engine, and an inner member having a inner surface for engaging the insert and an outer surface which engages the outer member along an interface which is inclined with respect to a direction of rotation of the rotor characterized by:

the insert comprising a solid resilient member which has an outer cylindrical surface which engages said portion of said one of the apex seal members; and the interface is positioned entirely radially outwardly from an outer surface of the corner seal member.

3. An apex seal assembly for a lobed rotor of a rotary engine wherein the rotor has an apex seal slot and a corner seal recess in an apex portion thereof, the seal assembly including an outer seal member and an inner support member mounted in the slot and recess, the inner and outer seal members engaging each other along an interface which is inclined with respect to a direction of rotation of the rotor, a corner seal member received in the corner seal recess and having a cylindrical outer surface and having a notch for receiving a portion of the seal assembly, characterized by:

the interface being positioned entirely radially outwardly and spaced apart from the outer surface of the corner seal member so that interface portions of the inner support and outer seal members cannot engage the corner seal member and cannot engage edges of the corner seal recess as the inner support and outer seal members move radially within the slot.

4. The seal assembly of claim 3, wherein:

the slot has a center line which is tilted with respect to a center line of a rotor lobe in which the slot is formed.

5. The seal assembly of claim 3, wherein:

the seal assembly includes an end seal member which engages ends of the outer seal member and the inner support member, the end seal member being partially received by the slot and by the corner seal recess;

the corner seal member has a central opening therein; and a solid cylindrical resilient insert is mounted in the central opening, an outer surface of the insert being engagable with the end seal member.

* * * * *